United States Patent
Yang et al.

(10) Patent No.: US 11,459,699 B2
(45) Date of Patent: Oct. 4, 2022

(54) ANTIBACTERIAL LEATHER, PREPARATION METHOD AND APPLICATION THEREOF

(71) Applicant: XIAMEN XIN DE LI INVESTMENT & DEVELOPMENT CO., LTD., Xiamen (CN)

(72) Inventors: Liguo Yang, Hong Kong (CN); Ziqiao Liu, Xiamen (CN); Siyong Chen, Xiamen (CN)

(73) Assignee: XIAMEN XIN DE LI INVESTMENT & DEVELOPMENT CO., LTD., Xiamen (CN)

( * ) Notice: Subject to any disclaimer, the term of this patent is extended or adjusted under 35 U.S.C. 154(b) by 328 days.

(21) Appl. No.: 16/553,208

(22) Filed: Aug. 28, 2019

(65) Prior Publication Data

US 2020/0318285 A1   Oct. 8, 2020

(30) Foreign Application Priority Data

Apr. 4, 2019   (CN) .......................... 201910272448.1

(51) Int. Cl.
| | |
|---|---|
| *D06N 3/00* | (2006.01) |
| *D06N 3/12* | (2006.01) |
| *C09D 7/80* | (2018.01) |
| *C09D 183/02* | (2006.01) |
| *B05D 3/02* | (2006.01) |
| *B05D 7/00* | (2006.01) |
| *C09D 183/04* | (2006.01) |
| *C09D 7/62* | (2018.01) |
| *C09D 5/14* | (2006.01) |
| *C09D 7/65* | (2018.01) |

(52) U.S. Cl.
CPC ......... *D06N 3/0059* (2013.01); *B05D 3/0209* (2013.01); *B05D 7/546* (2013.01); *C09D 5/14* (2013.01); *C09D 7/62* (2018.01); *C09D 7/65* (2018.01); *C09D 7/80* (2018.01); *C09D 183/02* (2013.01); *C09D 183/04* (2013.01); *D06N 3/0097* (2013.01); *D06N 3/128* (2013.01)

(58) Field of Classification Search
None
See application file for complete search history.

(56) References Cited

U.S. PATENT DOCUMENTS

| | | | | |
|---|---|---|---|---|
| 8,043,632 | B2 * | 10/2011 | Sabesan | C09D 5/14 424/443 |
| 8,092,815 | B2 * | 1/2012 | Sabesan | A61L 15/46 424/431 |
| 9,557,648 | B2 * | 1/2017 | Brust | C09D 7/67 |
| 9,957,396 | B2 * | 5/2018 | Huen | A01N 47/44 |

FOREIGN PATENT DOCUMENTS

| | | | |
|---|---|---|---|
| EP | 3719055 A1 | * | 10/2020 |
| WO | WO 2008075222 A1 | * | 6/2008 |

* cited by examiner

*Primary Examiner* — Tae H Yoon
(74) *Attorney, Agent, or Firm* — Bayramoglu Law Offices LLC

(57) ABSTRACT

An antibacterial leather uses the organic silica gel as the main component, uses the carboxymethyl chitosan silver as the antibacterial factor, and uses the modified nano-silica and the modified layered double oxide as the flame retardant factor. The synergistic effects between the components, such as the good binding between carboxymethyl chitosan silver and the substrate, the synergistic flame retardant effect between flame retardant factors, the bonding effect between modified nano-silica and dimethicone, and the synergistic effect between the high-viscosity dimethicone and the low-viscosity dimethicone are utilized to improve the process, thereby obtaining a good antibacterial, flame retardant and other properties, meanwhile meeting the requirement for the material mechanical properties and environmental protection.

3 Claims, No Drawings

ANTIBACTERIAL LEATHER, PREPARATION METHOD AND APPLICATION THEREOF

CROSS REFERENCE TO THE RELATED APPLICATIONS

This application is based upon and claims priority to Chinese Patent Application No. 201910272448.1, filed on Apr. 4, 2019, the entire contents of which are incorporated herein by reference.

TECHNICAL FIELD

The present disclosure relates to the field of leather material preparation, in particular to an antibacterial leather, a preparation method and an application thereof.

BACKGROUND

At present, the production processes of artificial leather and synthetic leather at home and abroad mainly include the dry polyurethane leather making process, the wet polyurethane leather making process and the waterborne polyurethane process, which all need to use the solvent-based polyurethane resin. The solvent-based polyurethane resin contains a large number of toxic and harmful chemical solvents, such as dimethylformamide (DMF), toluene, butanone, etc., which highly jeopardize the environment and human body through volatilization and residue.

After a lot of research and development work, the applicant has developed an environment friendly synthetic leather which is made of organic silica gel and environment friendly auxiliary materials. However, the improvement of this environment friendly synthetic leather has not been targeted to a specific application scenario, thereby restricting the application thereof.

Taking the antimicrobial property of leather as an example, due to the complex usage surroundings, leather, luggage, bags, shoes, clothing, sports equipment and medical equipment, especially sports equipment and medical equipment, are frequently touched by different people. Without the antibacterial property, bacteria are likely to breed, thereby generating mildew, stink, and even becoming the medium for spreading diseases.

In addition, the flame retardancy and wear resistance of leather are also two considerable factors. Up to now, there are few pieces of special project research on the environment friendly synthetic leather prepared by organic silica gel, so the present disclosure discloses a solution of antibacterial leather applied to luggage, bags, shoes, clothing and equipment.

SUMMARY

The objective of the present disclosure is to provide an antibacterial leather, a preparation method and an application thereof.

To achieve the above-mentioned objective, the technical solutions of the present disclosure are as follows:

An antibacterial leather includes a surface layer, an intermediate base material layer, a bottom layer and a base fabric layer, which are successively bonded. The surface layer includes the following ingredients in parts by weight:
  80-100 parts of organic silica gel;
  8-10 parts of hardener;
  3-5 parts of carboxymethyl chitosan silver;
  6-12 parts of dimethicone; and
  modified nano-silica, which, by weight, is not more than 1.9% of the total weight.

Preferably, the antibacterial leather further includes 10-30 parts of modified layered double hydroxide. The modified layered double hydroxide is modified by sodium stearate and layered double hydroxide in a ratio of (3-5):100 parts by weight. The modified nano-silica, by weight, is not less than 8% of the modified layered double hydroxide by weight.

Preferably, the modified nano-silica is modified by propyltrimethylsilane and nano-silica in a ratio of (12-18):100 parts by weight.

Preferably, the dimethicone is composed of high-viscosity dimethicone and low-viscosity dimethicone. The viscosity of the high-viscosity dimethicone is 100-300 mPa·s/25° C., and the viscosity of the low-viscosity dimethicone does not exceed 50 mPa·s/25° C. The low-viscosity dimethicone has 2-3 parts by weight.

The present disclosure also discloses a method of preparing an antibacterial leather, including:
  S1. preparing the surface layer:
  mixing 80-100 parts of organic silica gel, 8-10 parts of hardener, 3-5 parts of carboxymethyl chitosan silver, and 10-30 parts of modified layered double hydroxide to form a primary slurry;
  adjusting the viscosity of the primary slurry to 100000-120000 mPa·s/25° C. with 4-9 parts of high-viscosity dimethicone having a viscosity of 100-300 mPa·s/25° C. to form a secondary slurry;
  mixing a certain amount of modified nano-silica into the secondary slurry, and fully stirring to form a third slurry, wherein the modified nano-silica is not less than 8% of the modified layered double hydroxide by weight, and the modified nano-silica is not more than 1.9% of a total weight;
  applying the third slurry to the surface of the release paper/film with a coating thickness of 0.1 mm to form a coating film, and then putting into a multi-stage temperature difference oven, wherein the multi-stage temperature difference oven has a low temperature zone of 110° C., a medium temperature zone of 120° C. and a high temperature zone of 130° C. in sequence, and the coating film is baked in the low temperature zone for 1 min, and in the medium temperature zone for 2 min;
  coating 2-3 parts of the low-viscosity dimethicone with a viscosity not more than 50 mPa·s/25° C. evenly on the coating film after baking in the medium temperature zone, and then putting the coating film into the high temperature zone to be baked for 1 min to obtain the surface layer;
  S2. preparing the intermediate base material layer, the bottom layer and the base fabric layer in sequence.

Preferably, the modified layered double hydroxide is prepared by the following steps:
  adding sodium stearate and layered double hydroxide to a reaction kettle in a ratio of (3-5):100 parts by weight, and stirring at a temperature of 75-85° C. for 1 hour, and performing ultrasonic dispersion once every 10-15 minutes, 3-5 minutes each time during the stirring process.

Preferably, the modified nano-silica is prepared by the following steps:
  adding a certain amount of propyltrimethylsilane to the hydrolysate for being hydrolyzed at a temperature of 70-75° C. for 30±5 min to obtain a hydrolysis reaction product; adding a certain amount of nano-silica to a certain amount of absolute ethanol and ultrasonically dispersing for 10-15 minutes to obtain a dispersion solution; heating the hydrolysis reaction product and the dispersion solution to 80-85° C. in the reaction kettle, stirring at a constant temperature for 4 hours, cooling to the room temperature to obtain a cooled solution; centrifuging and drying the cooled solution until reaching a constant humidity to obtain the modified nano-silica;

The hydrolysate is prepared by ethanol with a volume fraction greater than 75% and hydrochloric acid with a concentration of 0.1 mol/L by volume of 1:1;

The adding ratio of each material is as follows:

| Propyltrimethylsilane | Nano-silica | Hydrolysate | Absolute ethanol |
|---|---|---|---|
| 12-18 g | 100 g | 1000 mL | 500 mL |

The present disclosure also discloses an application of the antibacterial leather as described above, which is applied to luggage, bags, shoes, sports equipment and medical equipment.

Compared with the prior, the above-mentioned technical solution of the present disclosure has the following advantages:

1. In the present disclosure, the carboxymethyl chitosan silver serves as an antimicrobial agent, which combines the advantages of safety, non-toxicity, natural broad-spectrum antimicrobial rate and good biocompatibility of chitosan, with the advantages of sustainable and effective sterilization of nano-silver. The synergistic sterilization of the chitosan and the nano-silver has better effect than that of a single antimicrobial agent. Further, the chitosan coats the nano-silver, and plays role in retarding releasing. Meanwhile, the modified nano-silica not only improves the tensile resistance, tear resistance and wear resistance of the leather, but also reacts with the dimethicone to form a mesh-like microporous film structure, which further enhances the fixation of carboxymethyl chitosan silver and improves its water washing resistance, and improves the mechanical properties of the colloid.

2. In the present disclosure, a layered double hydroxide (with a metal ion, rather than a heavy metal) serves as a flame retardant, to achieve an efficient flame retarding effect; and the decomposition temperature of the layered double hydroxide includes the low temperature end and the high temperature end, which broadens the range of the flame retardant temperature and has advantages of both flame retardants, namely, the aluminum hydroxide and the magnesium hydroxide. Meanwhile, the nano-silica has a large specific surface area and a small density, with the ease of accumulating on the molten surface during combustion. As a result, the nano-silica and the layered double hydroxide collectively form a dense carbon layer to hinder the heat and material transfer between the molten surface and the external, which plays a synergistic role in flame retardant, and reduces the usage amount of layered double hydroxides.

3. The nano-silica and the layered double hydroxide are modified in the present disclosure, which avoids agglomeration of the nano-silica and the layered double hydroxide, and have better dispersibility, and better compatibility with organic silica gel base material.

4. In the present disclosure, high-viscosity dimethicone and low-viscosity dimethicone not only cooperatively make the texture of the surface layer more delicate, but also fills the micropores in the microporous film due to high permeability of the low-viscosity dimethicone, so that the layered double hydroxide and the nano-silica are more firmly fixed in the base material.

5. In the present disclosure, there is no toxic and harmful substances in the preparation process, which is safe and environment friendly.

DETAILED DESCRIPTION OF THE EMBODIMENTS

In order to clearly describe the objectives, technical solutions and advantages of the present disclosure, the present disclosure will be further described in detail below in combination with the embodiments. It is understood that the specific embodiments described herein are merely illustrative of the present disclosure and forms no limit to the present disclosure.

Embodiment 1

Preparation of the Surface Layer of Antibacterial Leather:

80-100 parts of organic silica gel, 8-10 parts of hardener, 10-30 parts of modified layered double hydroxide, and 3-5 parts of carboxymethyl chitosan silver are mixed to form a primary slurry;

The viscosity of the primary slurry is adjusted to 100000-120000 mPa·s/25° C. by using 4-9 parts of high-viscosity dimethicone with a viscosity of 100-300 mPa·s/25° C. to form a secondary slurry;

A certain amount of modified nano-silica is mixed into the secondary slurry after adjusting the viscosity thereof, and then is fully stirred to form a third slurry. The modified nano-silica is not less than 8% of the modified layered double hydroxide by weight. The modified nano-silica is not more than 1.9% of the total weight.

The third slurry is applied to the surface of the release paper/film with a coating thickness of 0.1 mm to form a coating film, and then the release paper/film is put into a multi-stage temperature difference oven. The multi-stage temperature difference oven has a low temperature zone of 110° C., a medium temperature zone of 120° C. and a high temperature zone of 130° C. in sequence. The coating film is put in the low temperature zone and baked for 1 min, and the release paper/film was put in the medium temperature zone and was baked for 2 min;

2-3 parts of the low-viscosity dimethicone with a viscosity not more then 50 mPa·s/25° C. are coated evenly on the coating film baked in the medium temperature zone, and then the coating film is put into the high temperature zone and baked for 1 min to obtain a surface layer.

The specific embodiments are shown in the following table:

| Ingredients | A | B | C | D | E | F | G | F/C | F/All |
|---|---|---|---|---|---|---|---|---|---|
| Sample 1 | 80 | 8 | 10 | 4 | 2 | 0 | 3 | 0 | 0 |
| Sample 2 | 80 | 8 | 10 | 4 | 2 | 0.4 | 3 | 4% | 0.37% |
| Sample 3 | 80 | 8 | 10 | 4 | 2 | 0.6 | 3 | 6% | 0.56% |
| Sample 4 | 80 | 8 | 10 | 4 | 2 | 0.8 | 3 | 8% | 0.74% |
| Sample 5 | 80 | 8 | 10 | 4 | 2 | 0.9 | 3 | 9% | 0.83% |
| Sample 6 | 80 | 8 | 10 | 4 | 2 | 1.5 | 3 | 10% | 1.38% |
| Sample 7 | 80 | 8 | 10 | 4 | 2 | 2.1 | 3 | 21% | 1.92% |
| Sample 8 | 80 | 8 | 10 | 4 | 2 | 2.2 | 3 | 22% | 2.01% |
| Sample 9 | 80 | 8 | 10 | 4 | 2 | 2.5 | 3 | 25% | 2.23% |
| Sample 10 | 80 | 8 | 15 | 4 | 2 | 2.2 | 3 | 14.6% | 1.92% |
| Sample 11 | 80 | 8 | 20 | 4 | 2 | 2.3 | 3 | 11.5% | 1.92% |
| Sample 12 | 80 | 8 | 25 | 4 | 2 | 2.4 | 3 | 9.6% | 1.93% |
| Sample 13 | 80 | 8 | 30 | 4 | 2 | 2.4 | 3 | 8% | 1.93% |
| Sample 14 | 80 | 8 | 10 | 4 | 0 | 2.1 | 3 | 21% | 1.96% |
| Sample 15 | 80 | 8 | 10 | 4 | 5 | 2.1 | 3 | 21% | 1.90% |
| Sample 16 | 90 | 9 | 20 | 6 | 3 | 2.7 | 4 | 11.5% | 1.88% |
| Sample 17 | 100 | 10 | 30 | 9 | 3 | 3 | 5 | 10% | 1.88 |

In the table, A represents the organic silica gel, B represents the hardener, C represents the modified layered double hydroxide, D represents the high-viscosity dimethicone, E represents the low-viscosity dimethicone, F represents the modified nano-silica, G represents the carboxymethyl chitosan silver. If the value of an ingredient in the table is 0, and the single step is only to add the component, then the single step will be cancelled.

The organic silica gel used in this embodiment is 100% polysiloxane, whose molecular formula is $aSiO_2 \cdot nH_2O$; the hardener is 100% polysiloxane, whose molecular formula is $bSiO_2 \cdot nH_2O$; wherein a and b are degrees of polymerization, both greater than 2, and a>b; n is 1-3. The organic silica gel is an advanced silica gel produced by Xiamen Xinchuangli Silicone Co., Ltd.; the hardener is an advanced silica hardener produced by Xiamen Xinchuangli Silicone Co., Ltd. The modified components will be discussed in detail later.

Antibacterial Test:

Antibacterial test strips are prepared according to Samples 1, 3, 5, 7, 9, 14 and 15. The antibacterial test strips are routinely washed for 25 minutes each time. *Escherichia coli* and *Staphylococcus aureus* are used as test bacteria, and then bacteriostatic test (20 µL of a bacterial solution, the concentration of $5 \times 10^6$ cfu·ml$^{-1}$, adding agar medium, the temperature of 37° C., heat preservation for 24 h) is performed. The results are as follows:

| Antibacterial Test Strips | Washing Times | *Escherichia Coli* Contact Bactericidal Rate (%) | *Staphylococcus Aureus* Contact Bactericidal Rate (%) |
|---|---|---|---|
| 1 | 4 | 87.4 | 85.6 |
| 3 | 4 | 95.4 | 94.9 |
| 5 | 4 | 96.2 | 96.1 |
| 7 | 4 | 98.7 | 98.1 |
| 9 | 4 | 96.1 | 96.2 |
| 14 | 4 | 72.3 | 70.5 |
| 15 | 4 | 99.2 | 98.7 |

According to the above test strips 1, 3, 5 and 7, with the increase of modified nano-silica, the washing resistance of antibacterial factors in the test strips increases, because an appropriate amount of modified silica contributes to forming a mesh-like structure with dimethicone to capture carboxymethyl chitosan silver. On the contrary, the test strip 9 has a lower antibacterial value, which is supposed that the agglomeration of the excessive modified nano-silica affects the uniform distribution of the carboxymethyl chitosan silver.

Comparing the test strip 7 with the test strip 14, it can be seen that without adding the low-viscosity dimethicone, the micropores structure produced by the test strip itself and the micropores formed in the heating process can contain the anti-bacterial factors but also are prone to draining the anti-bacterial factors, thereby leading to the deterioration of the washing resistance.

Flame retardant test: the above-mentioned samples are only for the preparation of the surface layer, and there are also an intermediate base material layer, a bottom layer and a base fabric layer in practical application, so the thickness of the surface layer is relatively thin. According to the flame retardant test of the flame retardant material standard ANSI/UL-94-1985 grade B, the minimum thickness of the sample is 3 mm. Therefore, according to the ratio of samples 1-12, flame retardant test strips 1-12 with a length of 127 mm, a width of 12.7 mm and a minimum thickness of 3 mm (the drying time increases linearly and accordingly during preparation) are prepared to test the flame retardant capability of the surface layer.

The results are as follows:

| | Flame Retardant Test Strips | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Burning Speed (mm/min) | 34.9 | 31.5 | 29.3 | 26.8 | 26.7 | 26.3 | 26.1 | 26 | 25.9 | 25.2 | 24.3 | 23.7 | 23.2 |

According to the comparison results between the flame retardant test strip 1 and the flame-retardant test strip 2, the flame retardancy of the surface layer is remarkably improved after the addition of the modified nano-silica.

According to comparison results of the flame retardant test strips 1-4, in the case of quantified modifying the double hydroxide, the flame retardant effect of the test strip becomes better as the content of the modified nano-silica increases, which indicates that the modified nano-silica has a significant synergistic flame retardant effect with the modified double hydroxide.

According to the comparison results of the flame retardant test strips 4-9, when the ratio of the modified nano-silica to the modified double hydroxide reaches 8%, the flame retardant effect is improved restrictedly, wherein the slight increase is related to the flame retardant effect of the nano-silica itself.

According to the comparison results of the flame retardant test strips 9-13, the flame retardant effect is enhanced when the ingredients of the modified double hydroxide increases.

Mechanical properties test: the mechanical properties test is performed on the flame retardant test strips, and the results are as follows:

| | Flame Retardant Test Strips | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Tensile Strength (MPa) | 3.32 | 3.54 | 3.66 | 3.73 | 3.88 | 4.19 | 4.38 | 4.21 | 4.03 | 4.21 | 4.11 | 4.05 | 3.92 |
| Elongation At Break | 256 | 269 | 274 | 283 | 292 | 311 | 320 | 317 | 305 | 314 | 306 | 300 | 295 |

According to the test results of the flame retardant test strips 1-7, the mechanical properties of the surface layer are improved as the modified nano-silica increases, because the modified silica has a high specific surface area and a high activity, and can bond with the organic silica gel to form a mesh-like structure and improve mechanical properties.

According to the test results of the flame retardant test strip 7-9, the added modified nano-silica is preferably 1.9% of the total weight. With the further increase of modified nano-silica, the mechanical properties of the surface layer are reduced, because the excessive modified nano-silica agglomerates somewhere, thereby causing stress concentration, and reducing the mechanical properties of the surface layer. Therefore, it can be seen that there is a relatively contradictory relationship between the flame retardant factor and the tensile properties of the material. The present disclosure has made some tradeoff between the flame retardant factor and the tensile properties of the material, so that the samples 7, and 11-13 are superior to conventional silicone leather in terms of tensile strength and flame retardancy. However, in practical applications, it should still be adjusted based on the needs.

Washing Test:

Washing test strips are prepared with the reference to the ratios of the samples 7 and 14. The unmodified layered double hydroxide and nano-silica are used to prepare the comparative test strip 1 and the comparative test strip 2 are prepared. The flame retardant test strips 7, 14, and 15 are used in the washing test, which are washed under the normal washing conditions for 25 minutes each time. Thereafter, the flame retardant test was repeated with the dried test strip to obtain the following results (each value represents the burning speed in units of mm/min):

| Washing Times | 0 | 2 | 4 | 6 | 8 | 10 |
|---|---|---|---|---|---|---|
| Comparative Test Strip 1 | 27.2 | 28.1 | 30.2 | 32.1 | 35.4 | 36.4 |
| Comparative Test Strip 2 | 26.3 | 34.3 | 36.8 | 38.7 | 39.5 | 40.4 |
| Flame Retardant Test Strip 7 | 26.1 | 26.3 | 26.4 | 26.4 | 26.5 | 26.5 |

-continued

| Washing Times | 0 | 2 | 4 | 6 | 8 | 10 |
|---|---|---|---|---|---|---|
| Flame Retardant Test Strip 14 | 26.1 | 26.5 | 27.1 | 27.5 | 27.7 | 28.2 |
| Flame Retardant Test Strip 15 | 26.1 | 26.3 | 26.3 | 26.3 | 26.4 | 26.4 |

According to the comparison of the comparative test strip 1 and the flame retardant test strip 7, whether to perform the modification or not impinges on the fixing effect of the flame retardant factor in the leather. After several times of washing, the flame retardant performance of the comparative test strip 1 is significantly degraded. This is because the unmodified flame retardant factor has poor compatibility with the organic silica gel.

According to comparison of the comparative test strip 1 with the comparative test strip 2, and the comparison of the flame retardant test strip 7 with the flame retardant test strip 14, the test strip with the low-viscosity dimethicone has better adsorption effect on flame retardant factors since the test strip with the low-viscosity dimethicone has a high permeability and can infiltrate into the microporous structure of the film to fill the micropore. Meanwhile, the defects of air bubbles that may occur in the low and medium temperature zones can be remedied, the flame retardant factor is fixed, and the surface texture is more delicate.

According to the comparison between the flame retardant test strip 7 and the flame retardant test strip 14, although the flame retardant test strip 14 adds more dimethicone with low-viscosity, the fixing effect on the flame retardant factor no longer increases significantly.

Embodiment 2

In the present embodiment, the modified layered double hydroxide used in the present disclosure will be described.

The modified layered double hydroxide: the sodium stearate and the layered double hydroxide are added to a reaction kettle in a ratio of (3-5):100 parts by weight, and are stirred at a temperature of 75-85° C. for 1 hour. During stirring, an ultrasonic dispersion was performed once every 10-15 minutes, 3-5 minutes each time.

The effect of the ratio on the activation index:

| Addition of Sodium Stearate | 1% | 3% | 5% | 7% | 10% |
|---|---|---|---|---|---|
| Activation Index | 0.23 | 0.89 | 0.985 | 0.987 | 0.988 |

The applicant found in the study that the activation index increases rapidly with the increase of sodium stearate at the initial stage, however, when the amount of sodium stearate is increased to about 5% of the amount of layered double hydroxides, the activation index tends to be stable (approach 1). At this time, the activation index tends to be stable when the amount of sodium stearate continues to increase. For another, excessive sodium stearate would affect the mechanical properties of the material.

The effect of reaction temperature on the activation index:

| Temperature (° C.) | 30 | 50-70 | 75 | 80 | 85 | 90 | 95 | 100 |
|---|---|---|---|---|---|---|---|---|
| Activation Index | 0.86 | 0.962 | 0.981 | 0.985 | 0.983 | 0.982 | 0.98 | 0.97 |

It can be seen that, initially, with the increase of temperature, sodium stearate is first adsorbed on the portion where the layered double hydroxide is most active, and the activation index rises sharply. After that, the activation index enters a gentle growth zone in the temperature range of 50-70° C., then reaches the peak in the temperature range of 75-85° C., and decreases with the increase of temperature in the temperature range more than 85° C.

Embodiment 3

Preparation of Modified Silica:

A certain amount of propyltrimethylsilane (KH560) is added to the hydrolysate and is hydrolyzed at a temperature of 70-75° C. for 30±5 min to obtain a hydrolysis reaction product. A certain amount of nano-silica (10-30 nm) was added to a certain amount of absolute ethanol, and the ultrasonic dispersion is performed for 10-15 minutes to obtain a dispersion solution. The hydrolysis reaction product and the dispersion solution are heated to 80-85° C. in the reaction kettle, and stirred at a constant temperature for 4 hours, and then cooled to room temperature to obtain a cooled solution. The cooled solution is centrifuged and separated, and is dried to constant humidity to obtain modified nano-silica;

The hydrolysate is prepared by the ethanol with a volume fraction greater than 75% and the hydrochloric acid with a concentration of 0.1 mol/L by volume of 1:1;

The adding ratio of each material is as follows:

| Propyltrimethylsilane | Nano-silica | Hydrolysate | Absolute ethanol |
|---|---|---|---|
| 12-18 g | 100 g | 1000 mL | 500 mL |

The Effect of the Ratio on the Activation Index:

| Propyltrimethylsilane | 5% | 10% | 15% | 20% | 25% |
|---|---|---|---|---|---|
| Grafting Ratio | 7% | 7.8% | 9.6% | 8.3% | 7.7% |

With the increase of the amount of propyltrimethylsilane, the grafting ratio increases obviously. The grafting ratio is highest when the ratio of propyltrimethylsilane to nano-silica reaches 15%. Thereafter, the excessive amount of propyltrimethylsilane makes the redundant propyltrimethylsilane prone to self-agglomeration, thereby forming aggregates between particles. Further, the siloxane anions is generated to cause the depolymerization of propyltrimethylsilane which has been grafted on the surface of nano-silicon dioxide, which instead causes a decrease in the grafting ratio.

The effect of the reaction temperature on the grafting ratio:

| Temperature (° C.) | 30 | 60 | 75 | 80 | 85 | 90 | 95 | 100 |
|---|---|---|---|---|---|---|---|---|
| Grafting Ratio | 6.3% | 9.5% | 10.1% | 10.4% | 10.3% | 10.1% | 10.0% | 9.9% |

With the increase of temperature, the grafting ratio increases obviously, and reaches the highest value in the range of 80-85° C. Then, due to the high temperature, the Brownian motion is too intense, the collision probability of nano-silica increases, and agglomeration is likely to occur. Consequently, the grafting ratio tends to be stable or even slightly declines.

Embodiment 4

On the basis of embodiment 1, other layers are prepared.

Preparing an intermediate base material layer: 80-120 parts of organic silica gel and 10 parts of hardener are mixed into an organic silicone slurry, and 8-60 parts of toner were added into the silicone slurry. The viscosity of the organic silicone slurry is adjusted to 250000-300000 mPa·s/25° C. by using 0-20 parts of vinyl silicone oil, and the slurry is coated on the surface of the surface layer, with a coated thickness of 0.1 mm. The gradient drying (that is, using the multi-stage temperature difference oven in Embodiment 1) is performed to form an intermediate base material layer;

Preparing a bottom layer and fitting to a base fabric layer: 80-120 parts of the organic silica gel and 10 parts of hardener were mixed into a second organic silicone slurry, 2-5 parts of the nano-silica and 2-5 parts of the silane coupling agent are added. Then, the viscosity of the slurry is adjusted to 15000-25000 mPa·s/25° C. by using 0-20 parts of vinyl silicone oil. The slurry is coated on the intermediate base material layer, with a coated thickness of 0.15 mm, and then the intermediate base material layer is fitted to a base fabric layer. The gradient drying (that is, using the multi-stage temperature difference oven in Embodiment 1) is performed to form a final silicone leather.

The base fabric layer is a knitted fabric, a woven fabric, a super fiber, a suedette or a polyester fabric.

In the preparation of the bottom layer, the silane coupling agent is preferably trimethoxysilane, γ-(2,3-epoxypropoxy) propyltrimethoxysilane or vinyltris(β-methoxyethoxy)silane. Depending on the diffusion and coupling effect of the molecules, the coupling agent migrates into the nano-silica and the organic silicone to increase its adhesion to the base fabric layer.

Embodiment 5

The surface layer of the antibacterial leather prepared according to embodiment 1 or 4 has a good antibacterial property, a flame retardant property capable of effectively preventing scald on the surface, an exquisite texture and good mechanical properties (wear resistance, tension resistance). No hazardous substance is added in the preparation process, which is extremely environment friendly, and meets the actual needs of luggage, bags, shoes and clothing, sports equipment and medical equipment.

The above descriptions are only the preferred embodiments of the present disclosure, but the protection scope of the present disclosure is not limited thereto. Any easily available changes or substitutions made by a technician familiar with the technical field within the technical scope of the present disclosure shall be covered within the scope of protection of the present disclosure. Therefore, the protection scope of the present disclosure should be based on the protection scope of the claims.

What is claimed is:

1. A method of preparing an antibacterial artificial leather, comprising:

S1. preparing a surface layer:
mixing 80-100 parts of organic silica gel, 8-10 parts of hardener, 3-5 parts of carboxymethyl chitosan silver, and 10-30 parts of modified layered double hydroxide to form a primary slurry;

adjusting a viscosity of the primary slurry to 100000-120000 mPa·s/25° C. with 4-9 parts of high-viscosity dimethicone with a viscosity of 100-300 mPa·s/25° C. to form a secondary slurry;

mixing a predetermined amount of modified nano-silica into the secondary slurry, and fully stirring to form a third slurry, wherein the modified nano-silica is not less than 8% of the modified layered double hydroxide by weight, and the modified nano-silica is not more than 1.9% of a total weight;

applying the third slurry to a surface of a release paper/film with a coating thickness of 0.1 mm to form a coating film, and then inputting into a multi-stage temperature difference oven, wherein the multi-stage temperature difference oven has a low temperature zone of 110° C., a medium temperature zone of 120° C. and a high temperature zone of 130° C. in sequence, baking the coating film in the low temperature zone for 1 min, and baking the coating film in the medium temperature zone for 2 min;

coating 2-3 parts of the low-viscosity dimethicone with a viscosity not more than 50 mPa·s/25° C. evenly on the coating film baked in the medium temperature zone, and then baking the coating film in the high temperature zone for 1 min to obtain the surface layer;

S2. preparing an intermediate base material layer, a bottom layer and a base fabric layer in sequence;

S3. successively bonding the surface layer, the intermediate base material layer, the bottom layer, and the base fabric layer in sequence.

2. The method of preparing the antibacterial artificial leather of claim 1, wherein, the modified layered double hydroxide is prepared by the following steps:

adding sodium stearate and layered double hydroxide to a reaction kettle in a ratio of (3-5): 100 parts by weight, and stirring at a temperature of 75-85° C. for 1 hour, and performing ultrasonic dispersion every 10-15 minutes during stirring, wherein the ultrasonic dispersion is performed for 3-5 minutes each time.

3. The method of preparing the antibacterial artificial leather of claim 1, wherein, the modified nano-silica is prepared by the following steps:

adding a predetermined amount of propyltrimethylsilane to a hydrolysate; hydrolyzing the predetermined amount of propyltrimethylsilane at a temperature of 70-75° C. for 30±5 min to obtain a hydrolysis reaction product; adding a predetermined amount of nano-silica to a predetermined amount of absolute ethanol; ultrasonically dispersing for 10-15 minutes to obtain a dispersion solution; heating the hydrolysis reaction product and the dispersion solution to 80-85° C. in the reaction kettle; stirring at a constant temperature for 4 hours; cooling to room temperature to obtain a cooled solution; and centrifuging and separating the cooled solution, and drying until reaching constant humidity to obtain the modified nano-silica;

wherein, the hydrolysate is prepared by ethanol with a volume fraction greater than 75% and hydrochloric acid with a concentration of 0.1 mol/L by volume of 1:1;

an adding ratio of each material is as follows:

12-18 g of the propyltrimethylsilane;

100 g of the nano-silica;

1000 mL of the hydrolysate; and 500 mL of the absolute ethanol.

\* \* \* \* \*